United States Patent
Hashiba et al.

(10) Patent No.: US 6,265,801 B1
(45) Date of Patent: *Jul. 24, 2001

(54) PERMANENT MAGNET TYPE ELECTRICAL ROTATING MACHINE

(75) Inventors: Yutaka Hashiba, Kanagawa-ken; Tadashi Tokumasu, Tokyo; Kazuto Sakai; Norio Takahashi, both of Kanagawa-ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,480

(22) Filed: Jan. 22, 1999

(30) Foreign Application Priority Data

Jan. 23, 1998 (JP) .................................................. 10-010914

(51) Int. Cl.[7] .............................. H02K 1/00; H02K 3/48; H02K 1/12; H02K 9/00; H02K 9/08
(52) U.S. Cl. .......................... 310/214; 310/259; 310/216; 310/183; 310/156; 310/54; 310/57; 310/60 A; 310/68 B; 310/201; 310/51; 310/198
(58) Field of Search .................................... 370/214, 258, 370/259, 216, 213, 208, 197, 182, 183, 156, 54, 57, 64, 65, 60 A, 68 B, 201, 202, 196, 51, 198

(56) References Cited

U.S. PATENT DOCUMENTS

| | | | |
|---|---|---|---|
| 470,217 | * | 3/1892 | Stephens .............................. 310/214 |
| 2,711,008 | * | 6/1955 | Smith .................................. 29/155.5 |
| 2,727,161 | * | 12/1955 | Kilner et al. ............................ 310/54 |
| 2,763,794 | * | 9/1956 | Baudry .................................. 310/54 |
| 2,781,465 | * | 2/1957 | Schuff .................................. 310/216 |
| 3,827,141 | * | 8/1974 | Hallerback .............................. 29/596 |
| 3,963,950 | * | 6/1976 | Watanabe et al. ....................... 310/54 |
| 3,980,909 | * | 9/1976 | Klein ..................................... 310/50 |
| 4,204,314 | * | 5/1980 | Workman ............................... 29/597 |
| 4,403,401 | * | 9/1983 | Rosenberry ............................. 29/596 |
| 4,425,521 | | 1/1984 | Rosenberry, Jr. et al. .......... 310/214 |
| 4,748,359 | * | 5/1988 | Yahara et al. ......................... 310/156 |
| 4,755,698 | * | 7/1988 | Frister et al. .......................... 310/51 |
| 4,761,576 | * | 8/1988 | Savage ................................... 310/51 |
| 4,782,260 | * | 11/1988 | Gandhi et al. ....................... 310/216 |
| 4,801,832 | * | 1/1989 | Neumann ............................. 310/216 |
| 4,864,177 | * | 9/1989 | Yang ................................... 310/216 |
| 4,968,911 | * | 11/1990 | Denk .................................... 310/42 |

(List continued on next page.)

FOREIGN PATENT DOCUMENTS

| | | |
|---|---|---|
| 25 15 340 | 9/1976 | (DE) . |
| 8-172742 | 7/1996 | (JP) . |
| 8-205441 | 8/1996 | (JP) . |

OTHER PUBLICATIONS

European Search Report, Jun. 23, 2000.

*Primary Examiner*—Nestor Ramirez
*Assistant Examiner*—Dang Dinh Le
(74) *Attorney, Agent, or Firm*—Oblon, Spivak, McClelland, Maier & Neustadt, P.C.

(57) ABSTRACT

A permanent magnet electrical rotating machine wherein the slots of stator core 2A of stator 1A are rectangular enclosed slots 4A in which triangular projecting gaps 3a are formed on the inner periphery side of this stator core 2A. The stator core 2A is cooled by passing gas through the projecting gaps 3a. The magnet flux that reaches stator core 2A from permanent magnets 6 by passing through retaining ring 8 and air gap 9 is caused to pass the inner periphery sides of the projecting gaps a of the stator core 2A. By this means, oscillation of magnetic flux density in the peripheral direction is prevented, eddy currents in the retaining ring 8 which accompany this oscillation are reduced and temperature rise prevented.

18 Claims, 8 Drawing Sheets

U.S. PATENT DOCUMENTS

| | | | |
|---|---|---|---|
| 5,019,735 | * | 5/1991 | Lee ........................................... 310/89 |
| 5,148,090 | * | 9/1992 | Oku et al. ............................. 318/107 |
| 5,233,252 | * | 8/1993 | Denk .................................... 310/254 |
| 5,349,257 | * | 9/1994 | Hernden ............................. 310/68 B |
| 5,442,249 | * | 8/1995 | Zimmermann .......................... 310/91 |
| 5,698,917 | * | 12/1997 | Shultz .................................... 310/87 |
| 5,804,896 | * | 9/1998 | Takehara et al. ................... 310/67 R |
| 5,821,652 | * | 10/1998 | Hyypio ................................... 310/83 |

* cited by examiner

Fig.16

PERMANENT MAGNET TYPE ELECTRICAL ROTATING MACHINE

BACKGROUND OF THE INVENTION

1. Field of the Invention

The present invention relates to permanent magnet type electrical rotating machines, and more particularly to permanent magnetic type electrical rotating machines in which the construction of the stators is improved in order to prevent reduction of the properties of the permanent magnets that are the rotors.

2. Description of the Related Art

Figure 1:
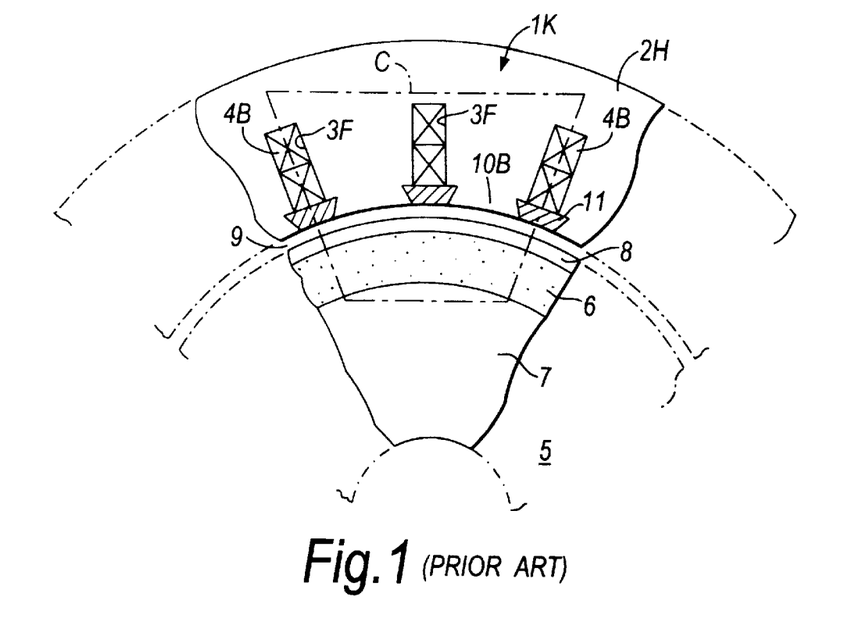
FIG. 1 is a partial longitudinal section view showing an example of a prior art permanent magnet type electrical rotating machine.
Figure 2:
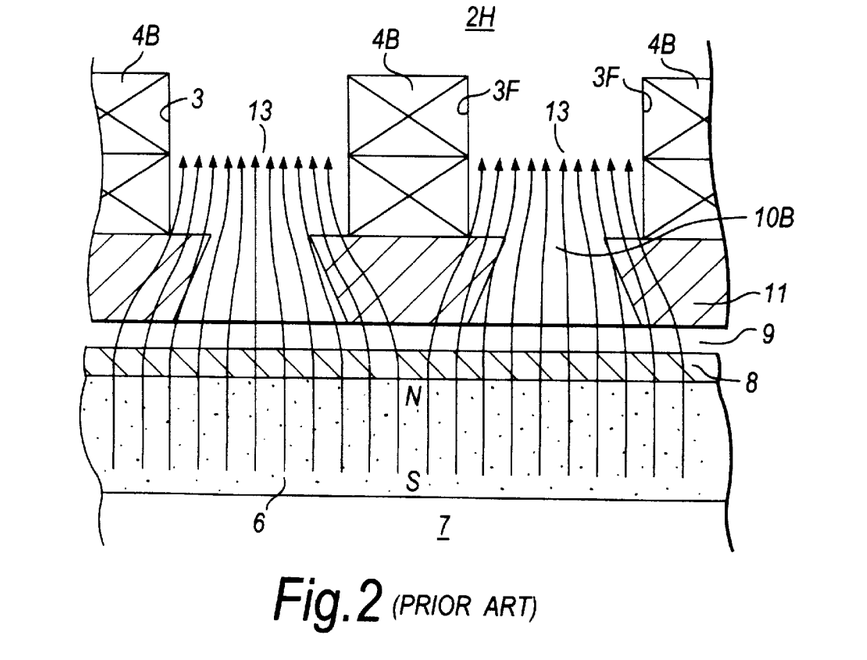
FIG. 2 is an enlarged developed illustration showing part C of FIG. 1.

FIG. 1 is a partial cross-section view, in a direction orthogonal to the axis, showing an example of a prior art permanent magnet type electrical rotating machine. FIG. 2 is an enlarged development view of part C of FIG. 1.

In FIG. 1 and FIG. 2, slots 3F are formed at equal intervals on the inner periphery of stator core 2H that is formed in a cylindrical shape by laying silicon steel punched plates one on another. Stator winding 4B is inserted into these slots 3F in two layers. Trapezoidal wedges 11, fabricated of magnetic material described later, are press-fitted into the inner periphery sides of slots 3F. Tooth-like parts 10B of the stator core are formed between slots 3F.

Wedges 11 are made of hardened material by mixing malleable iron powder with resin and a reinforcing agent to become high-resistance magnetic material with a relative magnetic permeability ($\mu$) of about 10~100.

At the same time, permanent magnets 6 of arc-shaped cross-section are mounted in close contact with the outer periphery of rotor core 7 in the peripheral direction and bonded with an adhesive agent to form rotor 5. Magnets magnetized with S poles on the inner periphery side and N poles on the outer periphery side are mounted alternately with magnets magnetized with the reverse polarity, according to the number of poles.

Prevention of the peeling-off of permanent magnets 6 due to the centrifugal force generated by high-speed rotation is designed by press-fitting cylindrical retaining ring 8 on the outer peripheries of these permanent magnets 6. Specified gap 9 is formed between the outer periphery of retaining ring 8 and inner periphery of stator core 2H.

In a permanent magnet type electrical rotating machine constructed in this way, magnetic flux 13 emanating from the outer periphery side of permanent magnets 6 reaches the outer periphery side of stator core 2H from wedges 11 and tooth-like parts 10B between these wedges 11 after passing through retaining ring 8 and gap 9, as shown in FIG. 2. From this outer periphery side, the flux once more passes through a magnetic path via the neighbouring permanent magnet poles.

This permanent magnetic type electrical rotating machine is driven in rotation at high speed by increasing the frequency of the inverter power source that excites stator winding 4B.

Figure 3:
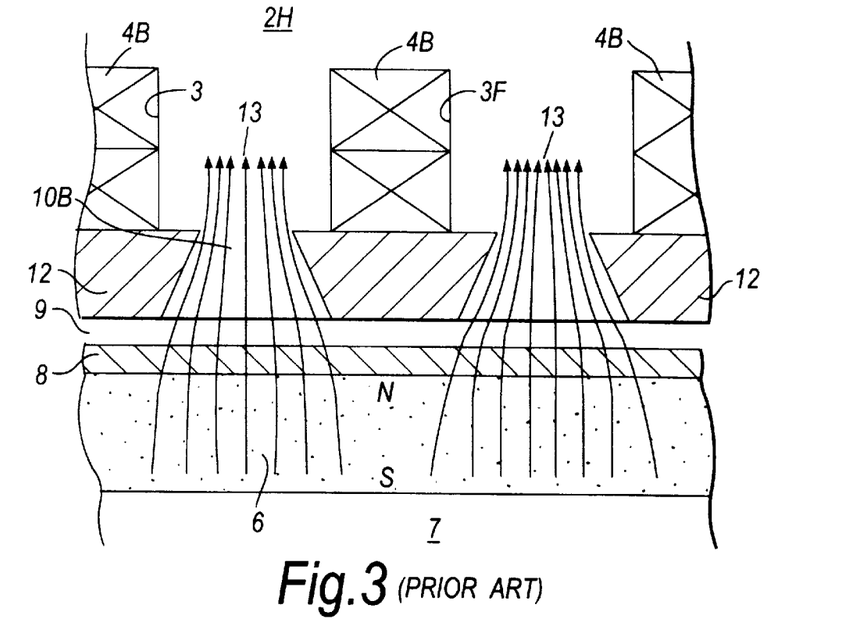
FIG. 3 is an enlarged developed illustration showing an example of a prior art permanent magnet type electric motor that differs from FIG. 2.

FIG. 3 is a drawing corresponding to FIG. 2, and is an enlarged partial development illustration showing the magnetic flux distribution emanating from a permanent magnet for the case when non-magnetic wedges 12 are used in place of magnetic material wedges 11.

In FIG. 3, the point of difference from above-mentioned FIG. 2 is that the greater part of magnetic flux 13 emanating from permanent magnets 6 passes through tooth-like parts 10B of stator core 2H while hardly any passes through non-magnetic wedges 12.

That is to say, hardly any flux passes through the inner periphery side of stator winding 4B, but is concentrated in the trapezoidal parts of the inner periphery sides of tooth-like parts 10.

Figure 4:
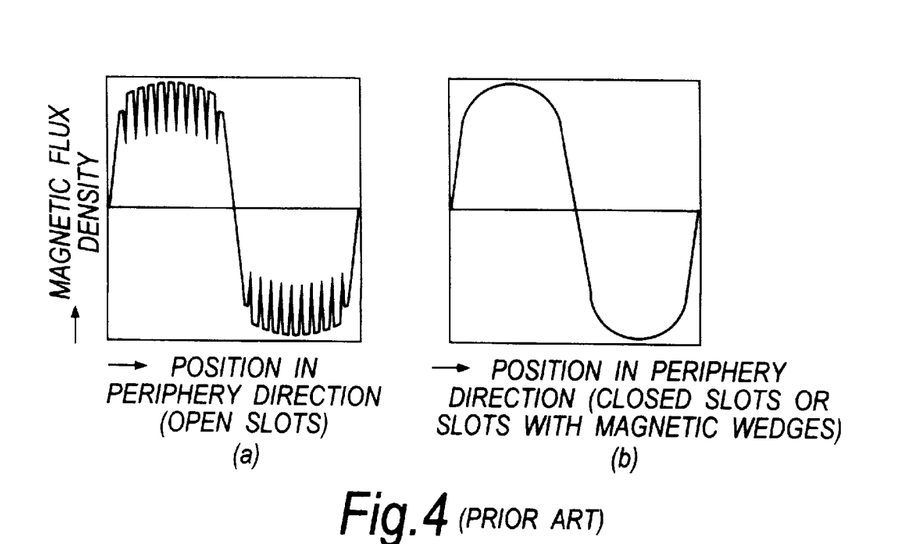

Consequently, the peaks of the sine wave of the magnetic flux passing between permanent magnets 6 and the stator oscillate as shown in FIG. 4($a$), and therefore the rotor torque oscillates.

On the other hand, with a permanent magnet type electrical rotating machine that incorporates magnetic material wedges 11 shown in FIG. 2, eddy currents flow in wedges 11 due to the magnetic flux passing through wedges 11. Thus, not only does the temperature of wedges 11 rise, but since, as mentioned above wedges 11 are made of hardened material, wedges 11 are very brittle, extreme care is required in their manufacture and assembly processes.

Moreover, eddy currents also flow in retaining ring 8 due to the magnetic flux passing through retaining ring 8. Since permanent magnets 6 are heated when the temperature of retaining ring 8 rises, the magnetic properties (coercive force) of permanent magnets 6 reduce.

SUMMARY OF THE INVENTION

Accordingly, one object of the present invention is to provide a novel permanent magnet type electrical rotating machine that may prevent the reduction in the permanent magnet properties consequent upon the temperature rise of the retaining ring, and may also solve the problem of wedge damage.

In order to achieve the above object, in a permanent magnet type electrical rotating machine of the present invention, in opposition to the inner part of a cylindrical stator, in which multiple enclosed slots that form projecting gaps on the shaft center side of their stator winding insertion parts are formed radially at equal intervals, a rotor, on the outer periphery of which multiple permanent magnets with their polarities reversed in the radial direction are closely mounted, is inserted on the same shaft, and a cylindrical retaining ring is closely inserted on the outer periphery of this rotor.

Also, in order to achieve the above object, in a permanent magnet type electrical rotating machine of the present invention, the stator winding is composed of U-shaped wire bundles of rectangular cross-section, and the open ends of the U-shapes are connected.

Moreover, in order to achieve the above object, in a permanent magnet type electrical rotating machine of the present invention, the stator is divided into two at the shaft center side, or the outer periphery side, of the stator winding.

Furthermore, in order to achieve the above object, in a permanent magnet type electrical rotating machine of the present invention, the shapes of the inner periphery of the outer stator and the outer periphery of the inner stator of a stator that is divided into two at the outer periphery side of the stator winding are formed as ellipses.

Still further, in order to achieve the above object, in a permanent magnet type electrical rotating machine of the present invention, the shapes of the inner periphery of the outer stator and the outer periphery of the inner stator of a stator that is divided into two at the outer periphery side of the stator winding are formed as circles having straight line parts in at least one place.

Again, in order to achieve the above object, in a permanent magnet type electrical rotating machine of the present invention, the shapes of the inner periphery of the outer stator and the outer periphery of the inner stator of a stator that is divided into two at the outer periphery side of the stator winding are formed in shapes from pentagons to polygons with the same number of angles as the number of stator coils.

Yet again, in order to achieve the above object, in a permanent magnet type electrical rotating machine of the present invention, the heat intake sides of heat pipes are installed in the projecting parts formed in the above-mentioned enclosed slots of the stator.

Also, in order to achieve the above object, in a permanent magnet type electrical rotating machine of the present invention, detector coils that detect the angle of rotation of the rotor are installed in the projecting gaps formed in the enclosed slots of the stator.

Moreover, in order to achieve the above object, in a permanent magnet type electrical rotating machine of the present invention, vibration suppression coils, through which a current corresponding to the rotor vibration is passed and that suppress the vibration of the rotor, are installed in the projecting gaps formed in the enclosed slots of the stator.

Furthermore, in order to achieve the above object, in a permanent magnet type electrical rotating machine of the present invention, projecting parts, against which the outer peripheries of the stator coils butt, are formed on the inner periphery of the outer stator that has been divided into two at the outer periphery side of the stator winding, and the outer periphery sides of the tooth-like parts of the inner stator interlock with these projecting parts.

Still further, in order to achieve the above object, in a permanent magnet type electrical rotating machine of the present invention, non-magnetic rear wedges are installed in outer periphery sides of the slots of the inner stator that is divided into two at the outer periphery side of the stator winding.

Again, in order to achieve the above object, in a permanent magnet type electrical rotating machine of the present invention, the permanent magnet type electrical rotating machine is made a super-high speed permanent magnet type electrical rotating machine.

By these means, with the present invention, the retaining ring and the inner periphery of the stator are set in continual magnetic opposition one against the other. Thus, oscillation of the magnetic flux distribution in the peripheral direction between this retaining ring and the stator is prevented, oscillation of the torque caused by this oscillation and the temperature rise due to eddy currents in the retaining ring are suppressed, and reduction of the properties of the permanent magnets is prevented.

BRIEF DESCRIPTION OF THE DRAWING

A more complete appreciation of the present invention and many of the attendant advantages therefor will be readily obtained as the same becomes better understood by reference to the following detailed description when considered in connection with the accompanying drawings, wherein:

FIG. 4(a) is a graph showing the working of the permanent magnet type electrical rotating machine shown in FIG. 3, while FIG. 4(b) is a graph showing the working of the permanent magnet type electrical rotating machine shown in FIG. 2;

FIG. 6(a) is an oblique view showing the stator winding that is assembled into the permanent magnet type electrical rotating machine shown in FIG. 5, while FIG. 6(b) is an enlargement of the cross-section view at B—B in FIG. 5(a);

FIG. 13(a) is a block diagram showing the operation of the seventh embodiment of the permanent magnet type electrical rotating machine of the present invention, while FIG. 13(b) is a block diagram showing the operation of an eighth embodiment of the permanent magnet type electrical rotating machine of the present invention;

DETAILED DESCRIPTION OF THE PREFERRED EMBODIMENTS

Referring now to the drawings, wherein like reference numerals designate identical or corresponding parts throughout the several views, and more particularly to FIG. 5 thereof, one embodiment of the present invention will be described.

Figure 5:
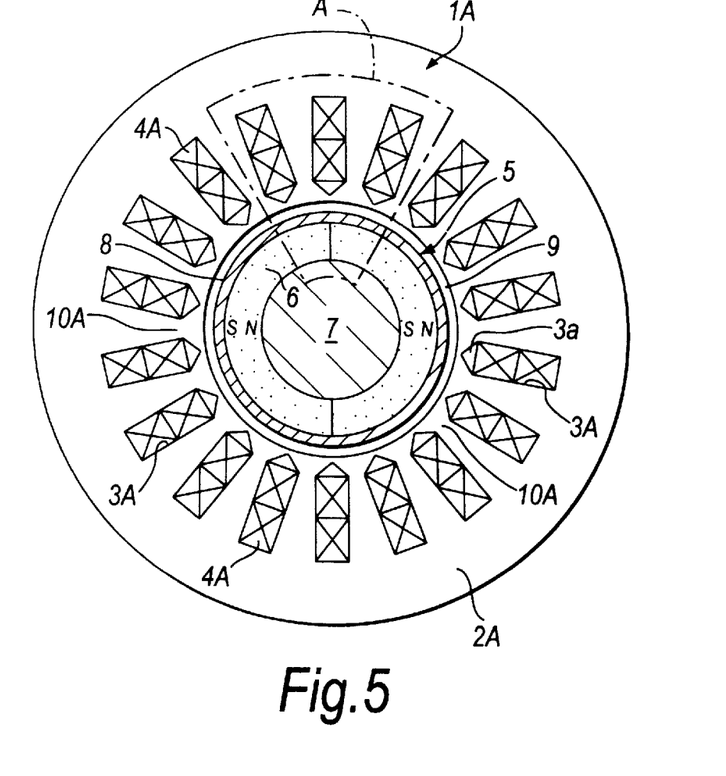
FIG. 5 is a longitudinal section showing a first embodiment of the permanent magnet type electrical rotating machine of the present invention.

FIG. 5 is a longitudinal section view showing a first embodiment of the permanent magnet type electrical rotating machine of the present invention, and corresponds to the prior art technology shown in FIG. 1.

Also, FIG. 6(a) is an oblique view showing a stator winding that is assembled into the permanent magnet type electrical rotating machine shown in FIG. 5, while FIG. 6(b) is an enlargement of the cross-section view at B—B in FIG. 5(a). FIG. 7 is an enlarged development illustration of part A of FIG. 5, and corresponds to the prior art technology shown in FIG. 2 and FIG. 3.

Figure 6:
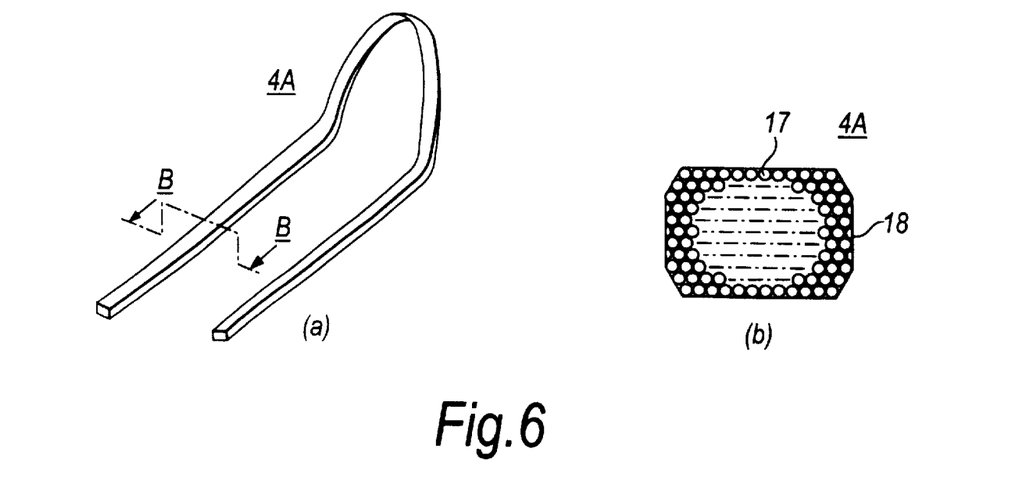
Figure 7:
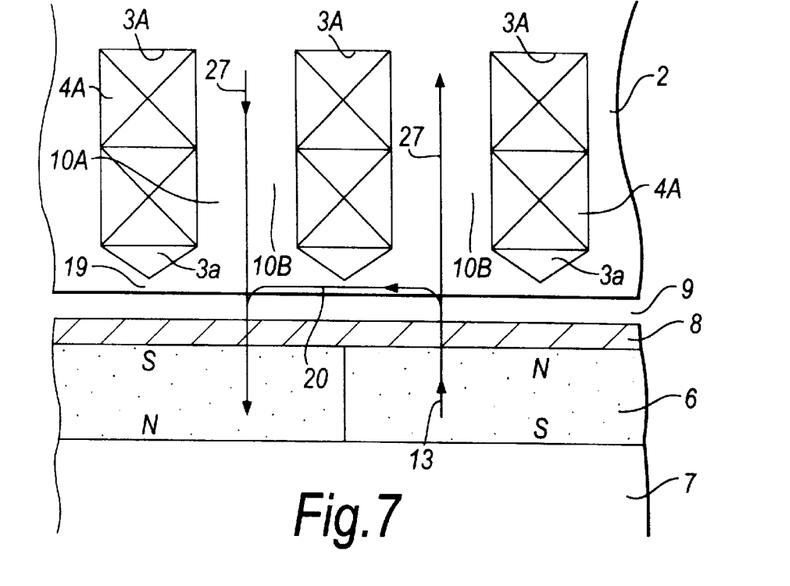
FIG. 7 is an enlarged development illustration of part A of FIG. 5.

In FIG. 5, FIG. 6 and FIG. 7, the points of difference from the prior art technology shown in FIG. 1, FIG. 2 and FIG. 3 are that, in the construction of the stator, the slots formed in the stator core and the stator winding inserted into these slots are different.

That is to say, slots 3A punched radially in stator core 2A do not form openings on the inner periphery side of stator winding 4A, which is inserted into these slots 3A. They are enclosed slots in which triangular prism-shaped projecting gaps are formed at the slot ends on the inner periphery side.

Also, stator windings 4A that are inserted in slots 3A are bent into U-shapes, as shown in FIG. 6(a), and after laying wire strands 17 one upon another in a roughly square shape, as shown in FIG. 6(b), outer skin insulation 18 is completed.

These stator windings 4A are inserted into each slot 3A of stator core 2A from one side in the axial direction. After connecting wires have been connected to the other ends by brazing, the connected parts are covered with insulating tape.

High magnetic permeability neodium·iron·boron alloy (Nd—Fe—B alloy) is adopted for permanent magnets 6 on the outer periphery of rotor 5, and, in FIG. 5, rotor 1A has two poles.

Next, the working of a permanent magnet type electrical rotating machine constructed in this way will be described.

Magnetic flux 13, shown in FIG. 7, that arrives at stator core 2A from permanent magnets 6, since no openings are formed on the inner periphery side of stator core 2A, passes via the broad opposing surfaces that are the opposing surfaces of retaining ring 8 and tooth-like parts 10B. This becomes main magnetic flux 27, almost all of which passes between stator windings 4A.

That is to say, further to the inner periphery side of stator winding 4A than the inner periphery sides of projecting gaps 3a, narrow magnetic paths are formed by projecting gaps 3a. Therefore, magnetic flux 20 that leaks to neighbouring poles by these narrow magnetic paths is small, and oscillation and reduction of torque may be prevented. Also, oscillation of the magnetic flux may be prevented, and magnetic flux distribution in the peripheral direction, such as shown in FIG. 4(b), may be produced. Therefore, the eddy currents generated in retaining ring 8 may also be suppressed.

Consequently, the magnetic flux oscillation shown in FIG. 4(a), which is generated in the permanent magnet type electrical rotating machine shown in FIG. 3 that uses non-magnetic wedges, and the torque oscillation caused by that oscillation, may be prevented.

At the same time, wire bundles 18 of narrow wire strands 17 are used in stator winding 4A. Therefore, the increase of resistance value caused by the skin effect of high-frequency exciting currents due to high-speed rotation may be prevented, and temperature rise due to this may be inhibited.

Moreover, by making projecting gaps 3a formed on the inner periphery sides of slots 3A parts for the percolation of cooling gas, stator winding 4A, which is the part with the highest temperature rise, may be cooled. Therefore deterioration of the insulation layer of stator winding 4A may be prevented, and its life may be extended. Thus, inspection and maintenance intervals may also be extended.

Also, torque oscillation may be prevented. Therefore, not only may speed adjustment times be shortened, but rotor vibration may be suppressed and bearing fatigue may also be prevented.

Next, a second embodiment of the permanent magnet type electrical rotating machine of the present invention will be described using FIG. 8.

Figure 8:
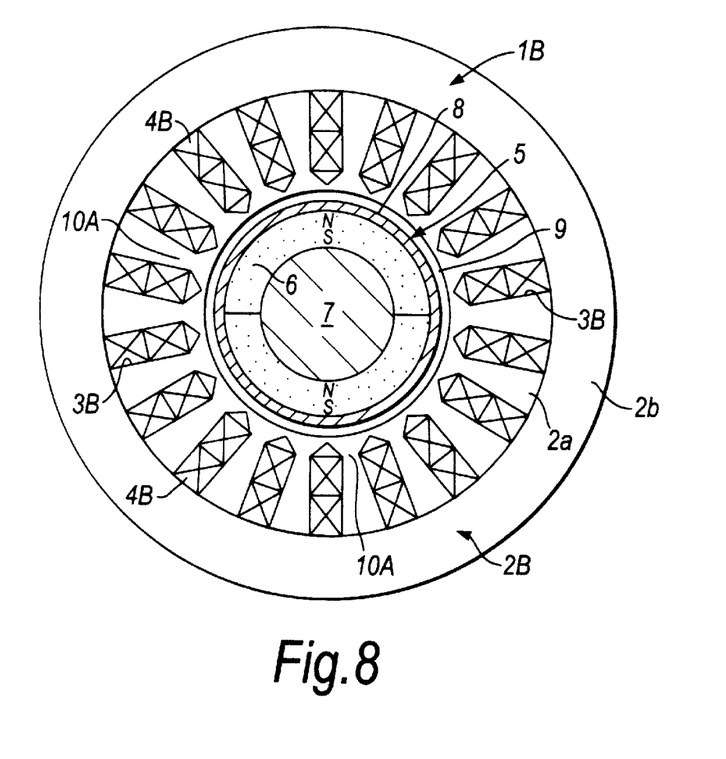
FIG. 8 is a longitudinal section view showing a second embodiment of the permanent magnet type electrical rotating machine of the present invention.

In FIG. 8, the points of difference from FIG. 5 showing the first embodiment described above are that the structure of the stator core is a two-division structure of a ring-shaped inner stator core and an outer stator core that is fitted outside this inner stator core. Apart from this, the remainder is the same as in the first embodiment shown in FIG. 5–FIG. 7. Consequently, like reference numerals have been assigned to elements that are the same as in FIG. 5–FIG. 7, and their descriptions have been omitted.

That is to say, stator core 2B shown in FIG. 7 is composed of approximately ring-shaped inner stator core 2a, of which the outer periphery side of stator winding 48 is the outer periphery, and outer stator core 2b, which is fitted on the outer periphery of this inner stator core 2a.

Consequently, slots 3B, into which stator winding 4B is inserted, are open on the outer periphery side of inner stator core 2a, and stator winding 4B of the same configuration as the stator winding shown by the prior art technology of FIG. 1 is fitted into them.

The work of fitting outer stator core 2b on inner stator core 2a is by heating outer stator core 2b by induction heating and then fitting it on inner stator core 2a into which stator winding 4B has been inserted. When cooled to normal temperature, it is in a press-fitted state.

In the running state, since the temperature rise value of inner stator core 2a is high relative to the temperature rise value of outer stator core 2b, the clamping force further increases.

In this case, stator winding 4B that has been produced with the same external shape as a prior art stator winding is incorporated. Thus, there is convertibility of manufacturing facilities, production is simple, and torque oscillation and the eddy currents generated in retaining ring 8 may also be reduced in the same way as with the first embodiment.

Figure 9:
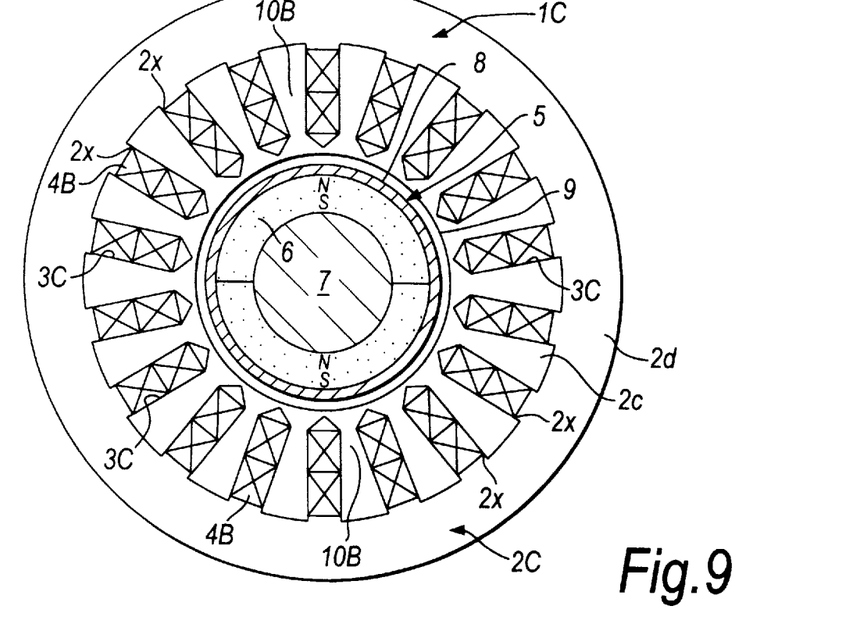
FIG. 9 is a longitudinal section view showing a third embodiment of the permanent magnet type electrical rotating machine of the present invention.

Next, FIG. 9 is a longitudinal section view showing a third embodiment of a permanent magnet type electrical rotating machine of the present invention, and corresponds to FIG. 5 and FIG. 8 that show embodiments mentioned above.

In FIG. 9, the point of difference from the embodiment shown in FIG. 8 is that, while it has the same stator core structure and, like FIG. 8, is divided into an inner stator core and an outer stator core, the configurations of those divided parts differ from FIG. B.

That is to say, with inner stator core 2c of stator core 2C shown in FIG. 9, the outer periphery sides of the tooth-like parts project slightly further than the face of the outer periphery side of stator winding 4B. Consequently, the surfaces of outer stator core 2d that make contact with the outer periphery of stator winding 4B project further inward than the outer periphery of inner stator core 2c. These adjacent parts form interlocking parts 2x, due to their slight unevenness.

In a permanent magnet type electrical rotating machine in which stator 1C is composed in this way, by slightly heating outer stator core 2d, it may be fitted on inner stator core 2c. After cooling to normal temperature, interlocking parts 2x bind closely together and, when running, the bonding strength of interlocking parts 2x further increases due to the heating of inner stator core 2c.

Figure 10:
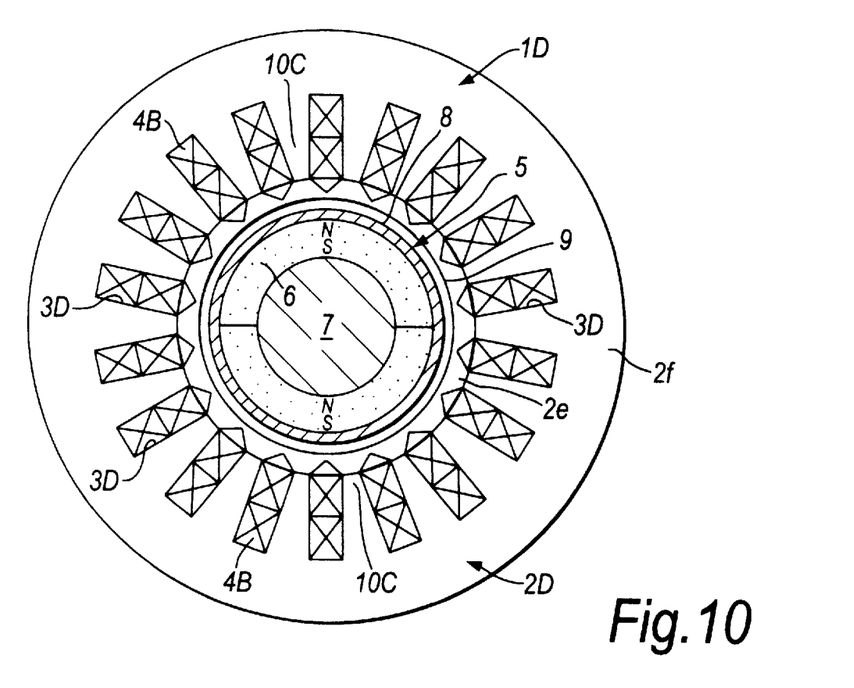
FIG. 10 is a longitudinal section view showing a fourth embodiment of the permanent magnet type electrical rotating machine of the present invention.

Next, FIG. 10 is a longitudinal section view showing a fourth embodiment of a permanent magnet type electrical rotating machine of the present invention and corresponds to FIG. 5, FIG. 8 and FIG. 9 that show embodiments mentioned above.

In FIG. 10, the point of difference from the embodiments shown in FIG. 8 and FIG. 9 is that, although there is the same stator core structure, which is divided into an inner stator core and an outer stator core as in FIG. 8 and FIG. 9, the location of that division differs from FIG. 8 and FIG. 9.

That is to say, inner stator core 2e and outer stator core 2f of stator core 2D shown in FIG. 10 are divided from each other at a position on the inner side face of stator winding 4A. Consequently, triangular prism-shaped gas passages for cooling are formed in the outer periphery side of inner stator core 2e.

In a permanent magnet type electrical rotating machine in which stator 1D is composed in this way, inner stator core 2e may be fitted by slightly heating outer stator core 2f. After cooling to normal temperature, the interlocked parts bind closely together and, when running, the bonding strength of the interlocked parts further increases due to the heating of inner stator core 2e.

Figure 11:
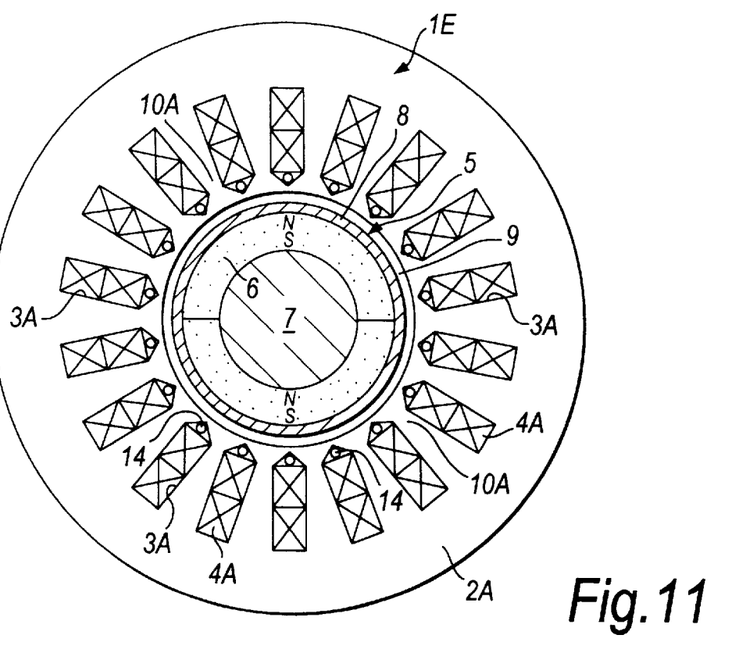
FIG. 11 is a longitudinal section view showing a fifth embodiment of the permanent magnet type electrical rotating machine of the present invention.

FIG. 11 is a longitudinal section view showing a fifth embodiment of a permanent magnet type electrical rotating machine of the present invention, and corresponds to FIG. 5 and FIG. 8~FIG. 10 that show embodiments mentioned above.

In FIG. 11, the point of difference from FIG. 5, in which the above-mentioned first embodiment is shown, is that the heat-intake sides of heat pipes 14 that use Freon as the refrigerant, are inserted in the triangular prism-shaped gaps of slots 3A of stator core 2A. The heat-release sides of these heat-pipes 14 are brazed to the outer frame of the stator.

In a permanent magnet type electrical rotating machine constructed in this way, the heat from the inner periphery side of stator winding 4A, which is the part with the highest temperature rise, is absorbed by the heat-intake sides of heat-pipes 14. The refrigerant, which has been gasified as a result, is condensed in the heat-release sides on the outer frame side and, after liquefaction, is caused to flow back to the heat-intake parts and cools stator winding 4A a second time. Thereafter, by repeating this, the insulating properties of the insulation layer of stator winding 4A, which determines the life and rated current of this electrical rotating machine, will be maintained.

Consequently, not only may reduction of the properties of the permanent magnets caused by the temperature rise of retaining ring 8 be prevented, but the conducting capacity of this permanent magnet type electrical rotating machine may be further increased, and its life may also be extended.

Figure 12:
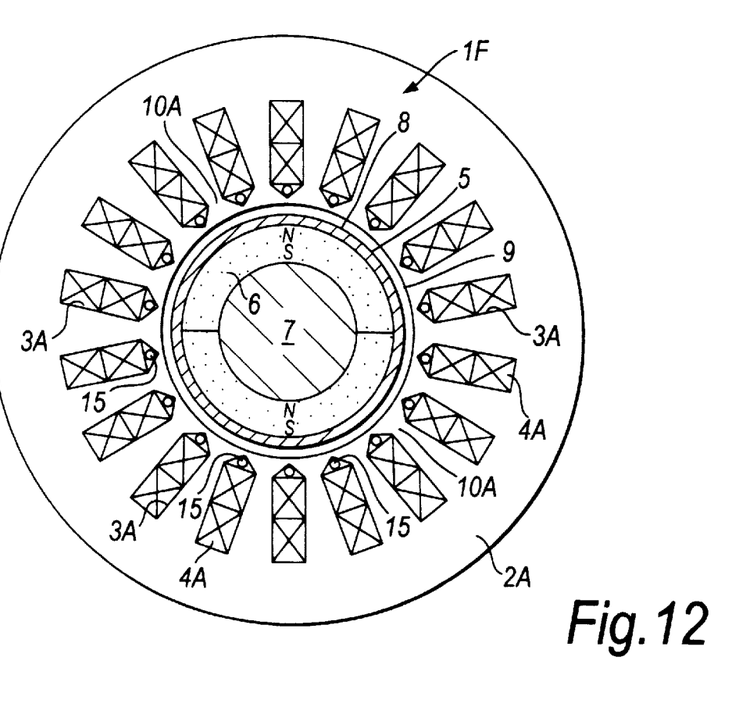
FIG. 12 is a longitudinal section view showing a sixth embodiment of the permanent magnet type electrical rotating machine of the present invention.

FIG. 12 is a longitudinal section view showing a sixth embodiment of a permanent magnet type electrical rotating machine of the present invention, and corresponds to the above-mentioned FIG. 5 and FIG. 8~FIG. 11.

In FIG. 12, the point of difference from FIG. 11 is that auxiliary winding 15 is inserted into the projecting gaps of slots 3A of stator core 2A, instead of heat pipes 14 shown in FIG. 11. The remainder is the same as in FIG. 11.

Figure 13:
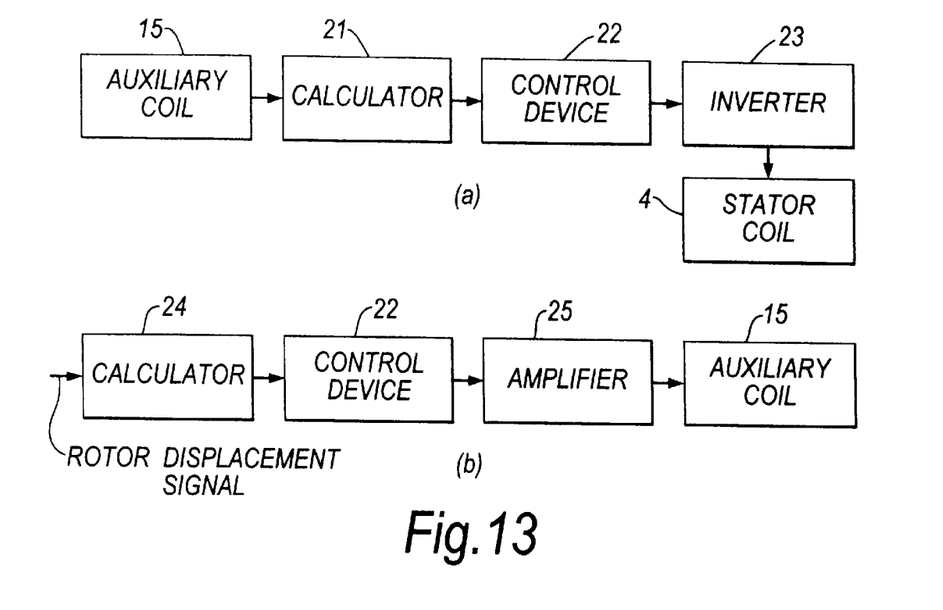

In a permanent magnet type electrical rotating machine constructed in this way, the voltage induced in auxiliary winding 15 by the magnetic fields of permanent magnets 6 as the rotor rotates is inputted to separately-located rotor magnetic pole position calculator 21, as shown in FIG. 13(a). Thus, the magnetic pole positions of permanent magnets 6 are detected.

This detection signal is inputted to separately-located inverter control device 22. A frequency is inputted to controlled inverter 23 by being ON/OFF controlled by the driving signal of inverter control device 22. The electric power of the frequency outputted from inverter 23 controls the speed of rotation of the rotor by being supplied to stator winding 4A.

Consequently, in a permanent magnet type electrical rotating machine constructed in this way, the unillustrated magnetic pole position detectors that, in prior art, were fitted on the end of the rotor shaft and the end of the stator casing may be eliminated. Therefore, the axial direction length of this electrical rotating machine may be shortened, and the inertia of the rotating parts may also be reduced. Thus, high-speed rotation becomes even more simple.

FIG. 13(b) is a block diagram showing a seventh embodiment of a permanent magnet type electrical rotating machine of the present invention, and corresponds to FIG. 13(a).

With this embodiment, the detection signal of the rotor vibration that is generated by high-speed rotation is inputted to rotor displacement calculator 24 that calculates rotor displacement. The result of calculation by rotor displacement calculator 24 is inputted to inverter control device 22 and is amplified by amplifier 25 incorporated in inverter control device 22. After this, the amplified electric power excites auxiliary winding 15, and the vibration that causes shaft-deviation is suppressed by the electromagnetic power of the magnetic flux generated by auxiliary winding 15.

Incidentally, the details of the operation at this time are described in a previous Application (Patent Application Heisei 9-180840).

Consequently, the rated maximum speed of rotation may be increased, and reduction of life due to vibration may be inhibited.

Next, an eighth embodiment of a permanent magnet type electrical rotating machine of the present invention will be described using FIG. 14.

Figure 14:
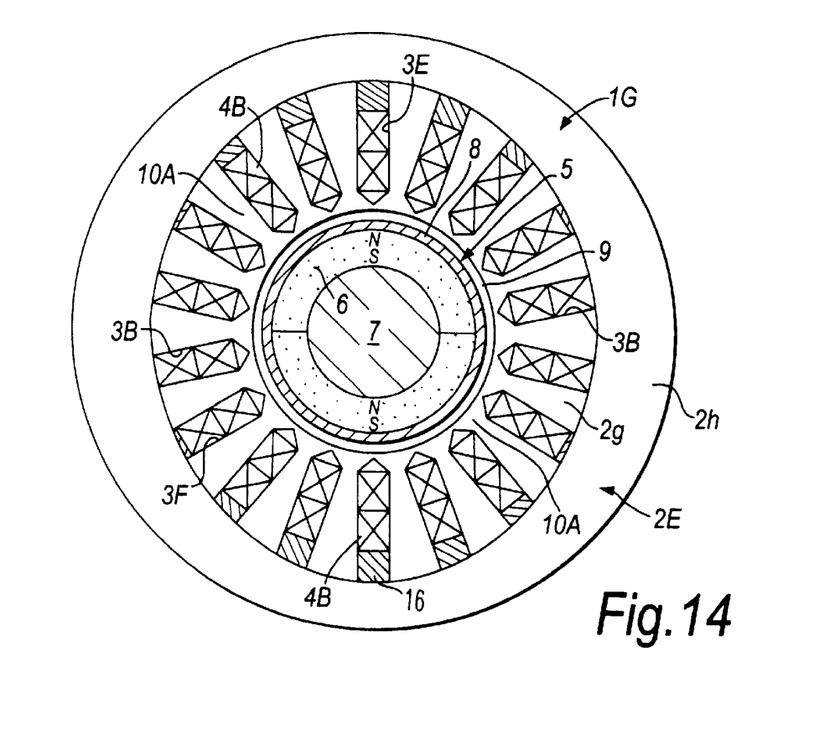
FIG. 14 is a longitudinal section view showing a ninth embodiment of the permanent magnet type electrical rotating machine of the present invention.

The point in which FIG. 14 differs from the above-mentioned second embodiment shown in FIG. 8 is in the two-division structure of the rotor core. The remainder is the same as in the second embodiment shown in FIG. 8. Consequently, like reference numerals have been assigned to elements that are the same as in FIG. 8, and their descriptions have been omitted.

That is to say, stator core 2E shown in FIG. 14 is composed of annular inner stator core 2g, of which the external diameters are, in the left to right direction a short diameter and in the front to back direction a long diameter, and outer stator core 2h, which is fitted to the outer periphery of inner stator core 2g. The reason for adopting this configuration is to prevent inner stator core 2g trying to turn under the turning force (torque) that is generated in inner stator core 2g as the rotor rotates.

Consequently, the slots into which stator winding 4B is inserted are shallow slots 3B on the short diameter side and deep slots 3E on the long diameter side. Stator winding 4B, of the same configuration as the stator winding shown in the prior art technology of FIG. 1, is incorporated in the same way as in FIG. 8.

For the work of fitting together outer stator core 2h and inner stator core 2g, outer stator core 2h is heated by induction heating and then fitted to inner stator core 2g, into which stator winding 4B has been inserted. When it has been cooled to room temperature, the stator core is in a press-fitted state.

In the running state, since the temperature rise value of inner stator core 2g is higher than the temperature rise value of outer stator core 2h, the clamping force further increases.

In this case also, stator winding 4B that has been produced with the same external shape as a prior art stator winding is incorporated. Thus, there is convertibility of manufacturing facilities, production is simple, and torque oscillation and the eddy currents generated in retaining ring 8 may also be reduced in the same way as with the first embodiment.

Figure 15:
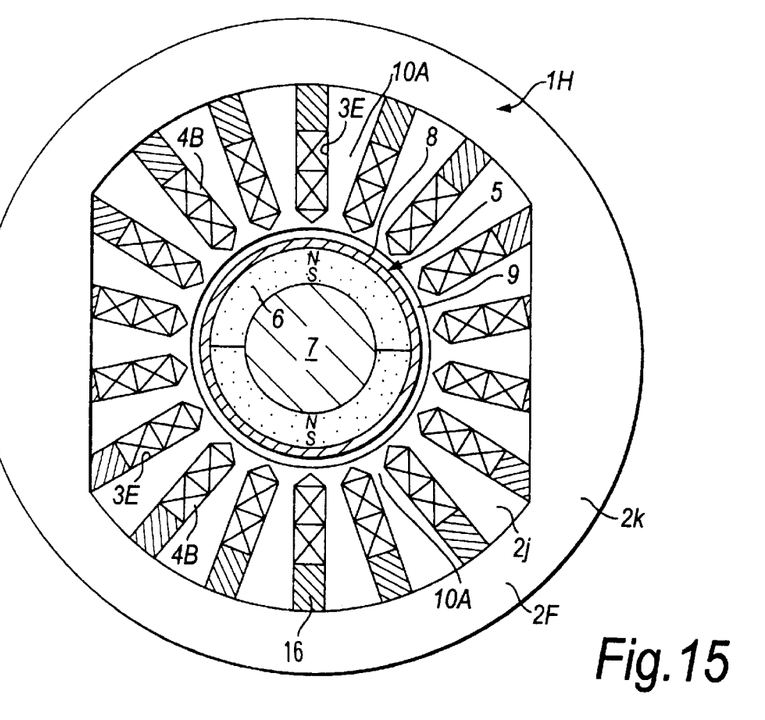
FIG. 15 is a longitudinal section view showing a tenth embodiment of the permanent magnet type electrical rotating machine of the present invention.

Next, FIG. 15 is a longitudinal section view showing a ninth embodiment of a permanent magnet type electrical rotating machine of the present invention, and corresponds to FIG. 5, FIG. 8, FIG. 9 and FIG. 14 that show above-mentioned embodiments.

In FIG. 15, the point of difference from the embodiment shown in FIG. 14 is that, although the stator core structure is similar and is divided into an inner stator core and an outer stator core in the same way as in FIG. 14, the configurations of those divisions differ.

That is to say, stator core 2F shown in FIG. 15 is composed of inner stator core 2j and outer stator core 2k. Parallel faces that fit closely together are formed in the outer periphery of inner stator core 2j and in the inner periphery of outer stator core 2k.

In the same way as in FIG. 14 above, non-magnetic rear wedges 16 are inserted into the slots formed in the outer periphery of inner stator core 2j.

In a permanent magnet type electrical rotating machine in which stator 1C is composed in this way, by slightly heating outer stator core 2k it may be fitted on inner stator core 2j and, after cooling to normal temperature, the interlocked parts will bind closely together. When running, the bonding strength of the interlocked parts further increases due to heating of inner stator core 2j.

Figure 16:
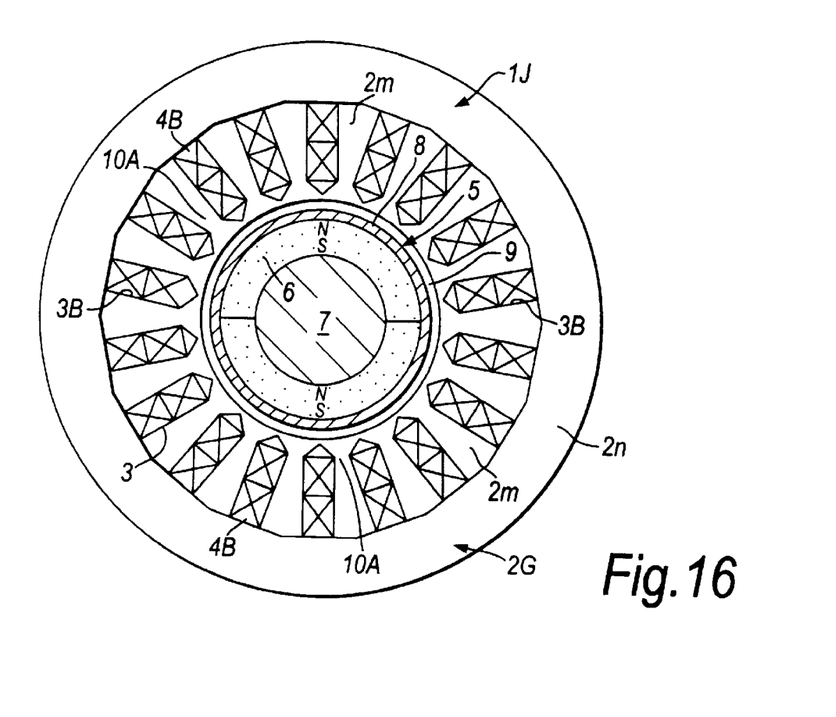
FIG. 16 is a longitudinal section view showing an eleventh embodiment of the permanent magnet type electrical rotating machine of the present invention.

Next, FIG. 16 is a longitudinal section view showing a tenth embodiment of a permanent magnet type electrical rotating machine of the present invention, and corresponds to FIG. 5, FIG. 8, FIG. 9, FIG. 14 and FIG. 15 showing above-mentioned embodiments.

In FIG. 16, the point of difference from the embodiment shown in FIG. 9 is that, although the stator core structure is similar and is divided into an inner stator core and an outer stator core at the outer peripheries of the slots part in the same way as in FIG. 9, the configuration of that division is, overall, a polygonal shape, being a series of short straight lines as opposed to the series of short arcs in FIG. 9.

That is to say, stator core 2G, shown in FIG. 16 is composed by the interlocking of inner stator core 2m and outer stator core 2n, and also in FIG. 16, there is a regular 18-angled polygon (octadecagon) with the same number of angles as there are stator windings 4B.

In a permanent magnet type electrical rotating machine in which stator 1J is constructed in this way, by slightly heating outer stator core 2n, inner stator core 2m may be inserted into it. After cooling to normal temperature, the interlocking parts will bind closely together. When running, the bonding strength of the interlocking parts will further increase due to heating of inner stator core 2m.

Incidentally, heat pipes 14 shown in FIG. 11 or the auxiliary coils shown in FIG. 12 may also be inserted in the slots of the embodiments shown in FIG. 15~FIG. 16. Thus, improvement in the cooling effect or further increase of speed through reducing inertia and vibration by shortening of the rotor may be designed.

When using the present invention, a rotor, in which a plurality of permanent magnets with polarities alternately reversed in the radial direction are closely bonded to its outer periphery, is inserted on the same shaft as a tube-like stator, in which a plurality of enclosed slots that form projecting parts on the axial side of the stator coil insertion parts are formed radially at equal intervals. By inserting and tightly bonding a cylindrical retaining ring on the outer periphery of this rotor, continual magnetic opposition is set between the retaining ring and the inner periphery of the stator. Thus, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring.

In particular, when using the present invention, the influence of skin-effect during high-speed rotation is reduced by composing the stator coils by rectangular cross-section wire bundles of wire strands formed in U-shapes, and connecting the open ends of the U-shapes. Also, when using the present invention, incorporation of the stator winding is simplified by dividing the stator into two on the axial side or the outer periphery side of the stator winding, and continual magnetic opposition is set between the retaining ring and the inner periphery of the stator. Thus, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Moreover, when using the present invention, the shapes of the inner periphery of the outer stator and the outer periphery of the inner stator, of the stator that is divided into two at the outer periphery of the stator winding, are made elliptical. Furthermore, when using the present invention, assembly is simple and mutual slippage during rotation is prevented by making the shapes of the inner periphery of the outer stator and the outer periphery of the inner stator, of a stator that is divided into two at the outer periphery of the stator winding, circles provided with straight lines in at least one place. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Also, when using the present invention, mutual slippage during rotation is prevented by making the shapes of the inner periphery of the outer stator and the outer periphery of the inner stator, of a stator that is divided into two at the outer periphery of the stator winding, any shape from pentagons to polygons with the same number of angles as the number of stator coils. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Moreover, when using the present invention, the heat-intake sides of heat pipes are inserted in the projecting parts formed in the enclosed slots of the stator, thus inhibiting any temperature rise of the stator winding. Furthermore, when using the present invention, the shaft length of the rotor is decreased by inserting detector coils, that detect the angle of rotation of the rotor, into the projecting gaps formed in the enclosed slots of the stator. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Also, when using the present invention, vibration is suppressed by inserting vibration suppressor coils, that suppress vibration by passing currents corresponding to the vibration of the rotor, into the projecting gaps formed in the enclosed slots of the stator. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Moreover, when using the present invention, mutual slippage is prevented by forming projecting parts on the inner periphery of the outer stator that is divided into two by the outer periphery of the stator winding that butt against the outer peripheries of the stator coils, and interlocking the projecting parts between the outer peripheries of the tooth-like parts of the inner stator. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Furthermore, when using the present invention, the stator coils are rendered operable by inserting non-magnetic rear wedges in the outer periphery sides of slots of the inner stator that is divided into two at the outer periphery of the stator winding. At the same time, by setting continual magnetic opposition between the retaining ring and the inner periphery of the stator, oscillation of the magnetic flux distribution in the periphery direction between this retaining ring and the rotor is prevented; the torque oscillation and retaining ring eddy currents caused by this magnetic oscillation are suppressed; and reduction of the permanent magnet properties is also prevented. Therefore it is possible to obtain a permanent magnet type electrical rotating machine that may prevent the reduction of the permanent magnet properties that accompanies temperature rise of the retaining ring, and may solve the problem of wedge damage.

Obviously, numerous additional modifications and variations of the present invention are possible in light of the above teachings. It is therefore to be understood that within the scope of the appended claims, the present invention may be practised otherwise than as specially described herein.

What is claimed as new and desired to secured by Letters Patent of the United States is:

1. A permanent magnet electrical rotating machine, comprising:

a tube-shaped stator comprising a plurality of enclosed slots formed radially at equal intervals, a stator winding disposed in said enclosed slots, and said slots having empty triangular prism shaped projecting gaps disposed at an inner periphery side of the enclosed slots to close said enclosed slots;

a rotor which is inserted inside, and co-axially with, said stator and on the outer periphery of which as plurality of permanent magnets is closely bonded with radial direction polarities alternately reversed; and a cylindrical retaining ring which is closely bonded to said outer periphery of said rotor.

2. A permanent magnet electrical rotating machine according to claim 1, wherein:

the stator winding comprises rectangular cross-section wire bundles formed in U-shapes, with open ends of an U-shapes being connected.

3. A permanent magnet electrical rotating machine according to claim 1, wherein:

said stator is divided into two parts at at least one of an inner periphery side or an outer periphery side of said stator winding.

4. A permanent magnet electrical rotating machine according to claim 3, wherein:

said stator comprises an inner stator surrounded by an outer stator and separated from each other at an outer periphery side of said stator winding, and an inner periphery of said outer stator and an outer periphery of said inner stator have shapes which are ellipses.

5. A permanent magnet electrical rotating machine according to claim 3, wherein:

said stator comprises an inner stator surrounded by an outer stator and separated from each other at an outer periphery side of said stator winding, and an inner periphery of said outer stator and an outer periphery of said inner stator have shapes which are partial circles provided with straight lines in at least one place.

6. A permanent magnet electrical rotating machine according to claim 3, wherein:

said stator comprises an inner stator surrounded by an outer stator and separated from each other at an outer periphery side of said stator winding, and an inner periphery of said outer stator and an outer periphery of said inner stator have a multi-sided shape from pentagons to polygons having the same number of angles as the number of coils in said stator winding.

7. A permanent magnet electrical rotating machine according to any of claim 1 to 6, further comprising:
   heat pipes having heat-intake sides inserted in said triangular prism shaped projecting gaps.

8. A permanent magnet electrical rotating machine according to any of claim 1 to claim 6, further comprising:
   detector coils (windings), which detect an angle of rotation of said rotor, being inserted in said projecting gaps.

9. A permanent magnet electrical rotating machine according to any of claim 1 to claim 6, further comprising:
   vibration suppressor coils (windings), through which currents corresponding to the vibration of said rotor are passed and suppress said vibration, being inserted in said projecting gaps.

10. A permanent magnet electrical rotating machine according to any of claim 1 to claim 6, wherein:
    said permanent magnet type electrical rotating machine is operated at a super-high-speed.

11. A permanent magnet electrical rotating machine according to claim 7, wherein:
    said stator is divided into an inner stator and an outer stator at the outer periphery side of said stator winding, and
    the inner periphery of the outer stator comprises inwardly projecting parts, against which outer peripheries of the coils (windings) of said stator winding butt, and
    said inner stator has tooth-like parts interlocking between said inwardly projecting parts.

12. A permanent magnet electrical rotating machine according to any of claim 7, wherein said stator is divided into an inner stator and an outer stator at the outer periphery side of said stator winding, further comprising:
    said inner stator having said enclosed slots in which the stator winding is disposed, and non-magnetic rear wedges being inserted in outer periphery sides of the enclosed slots.

13. A permanent magnet electrical rotating machine according to claim 8, wherein:
    said stator is divided into an inner stator and an outer stator at the outer periphery side of said stator winding, and
    the inner periphery of the outer stator comprises inwardly projecting parts, against which outer peripheries of the coils (windings) of said stator winding butt, and
    said inner stator has tooth-like parts interlocking between said inwardly projecting parts.

14. A permanent magnet electrical rotating machine according to any of claim 8, wherein said stator is divided into an inner stator and an outer stator at the outer periphery side of said stator winding, further comprising:
    said inner stator having said enclosed slots in which the stator winding is disposed, and non-magnetic rear wedges being inserted in outer periphery sides of the enclosed slots.

15. A permanent magnet electrical rotating machine according to claim 9, wherein:
    said stator is divided into an inner stator and an outer stator at the outer periphery side of said stator winding, and
    the inner periphery of the outer stator comprises inwardly projecting parts, against which outer peripheries of the coils (windings) of said stator winding butt, and
    said inner stator has tooth-like parts interlocking between said inwardly projecting parts.

16. A permanent magnet electrical rotating machine according to any of claim 9, wherein said stator is divided into an inner stator and an outer stator at the outer periphery side of said stator winding, further comprising:
    said inner stator having said enclosed slots in which the stator winding is disposed, and non-magnetic rear wedges being inserted in outer periphery sides of the enclosed slots.

17. A permanent magnet electrical rotating machine according to claim 3 wherein:
    said stator is divided into an inner stator and an outer stator at the outer periphery side of said stator winding, and
    the inner periphery of the outer stator comprises inwardly projecting parts, against which outer peripheries of the coils (windings) of said stator winding butt, and
    said inner stator has tooth-like parts interlocking between said inwardly projecting parts.

18. A permanent magnet electrical rotating machine according to any of claims 3, 4, or 5, wherein said stator is divided into an inner stator and an outer stator at the outer periphery side of said stator winding, further comprising:
    said inner stator having said enclosed slots in which the stator winding is disposed, and non-magnetic rear wedges being inserted in outer periphery sides of the enclosed slots.

* * * * *